United States Patent [19]

Tani

[11] Patent Number: 5,778,034
[45] Date of Patent: Jul. 7, 1998

[54] CONTROL ROD DRIVE MECHANISM

[75] Inventor: Zenshin Tani, Yokohama, Japan

[73] Assignee: Kabushiki Kaisha Toshiba, Kawasaki, Japan

[21] Appl. No.: 773,767

[22] Filed: Dec. 24, 1996

[30] Foreign Application Priority Data

Dec. 26, 1995 [JP] Japan ................................. 7-338346

[51] Int. Cl.$^6$ ...................................................... G21C 7/16
[52] U.S. Cl. ...................... 376/353; 376/230; 376/233; 376/262
[58] Field of Search ........................... 376/230, 233–235, 376/260, 262, 271, 353, 362

[56] References Cited

U.S. PATENT DOCUMENTS

| | | | |
|---|---|---|---|
| 4,092,213 | 5/1978 | Mishimura | 376/230 X |
| 4,978,494 | 12/1990 | Rinker | 376/235 |
| 5,331,675 | 7/1994 | Hosoya et al. | 376/233 X |

FOREIGN PATENT DOCUMENTS

| | | |
|---|---|---|
| 4-50695 | 2/1992 | Japan . |
| 04-269694 | 9/1992 | Japan . |
| 05-087966 | 4/1993 | Japan . |

Primary Examiner—Daniel T. Pihulic
Assistant Examiner—Matthew J. Lattig
Attorney, Agent, or Firm—Foley & Lardner

[57] ABSTRACT

This control rod drive limiter removes the need for piping for extraction drive, increases the reliability of linkage with respect to the control rod, and removes the need of a speed limiter for the control rod, since there is no need to assume that the linkage might be released, thus reducing the building costs.

A stop piston 112 is disposed so as to cover a buffer piston 110 and a buffer spring 111 from above, rollers 113 are disposed above this stop piston 112, and the lower end of a piston tube 107 is fixed to a flange 103a in such a manner that the piston tube 107 does not move in the axial and peripheral directions. A collet piston 115, collet fingers 116, and a return spring 117 are disposed between an outer tube 104 and a cylinder tube 105. A guide cap 120 is disposed at the upper end of the outer tube 104. Guide grooves 106c that engage with the rollers 113 are provided in the index tube 106. In order to omit the speed limiter of the control rod, the connection with the control rod is implemented by a bayonet coupling 106a provided at the upper end of the index tube 106.

5 Claims, 4 Drawing Sheets

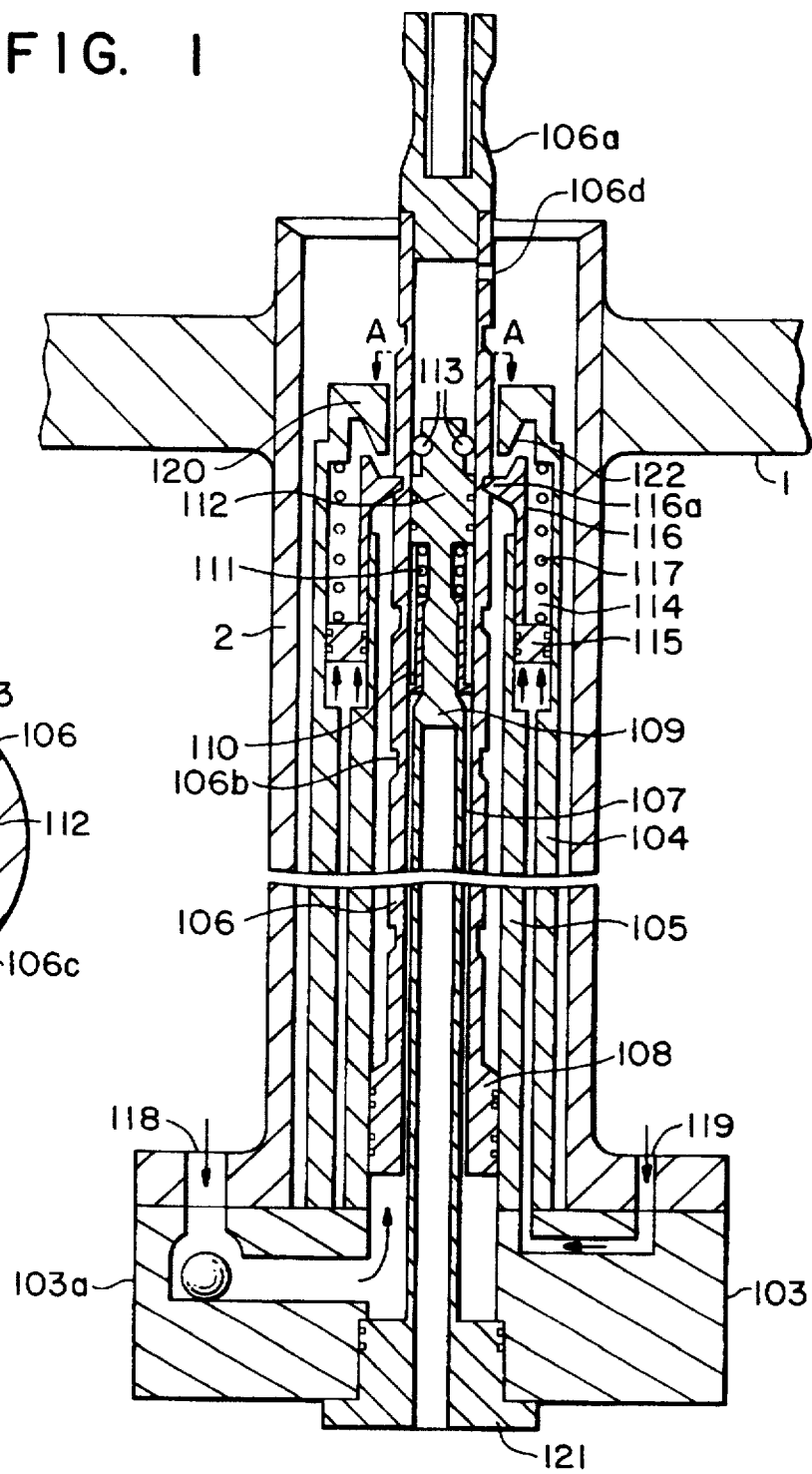

FIG. 5A
PRIOR ART
FIG. 5B
PRIOR ART
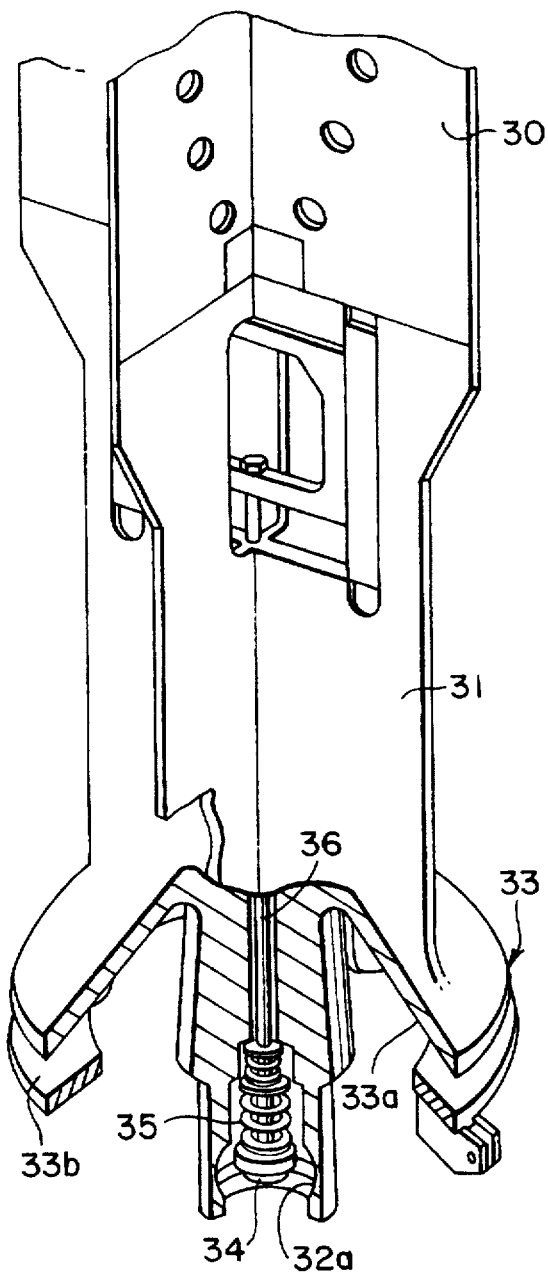
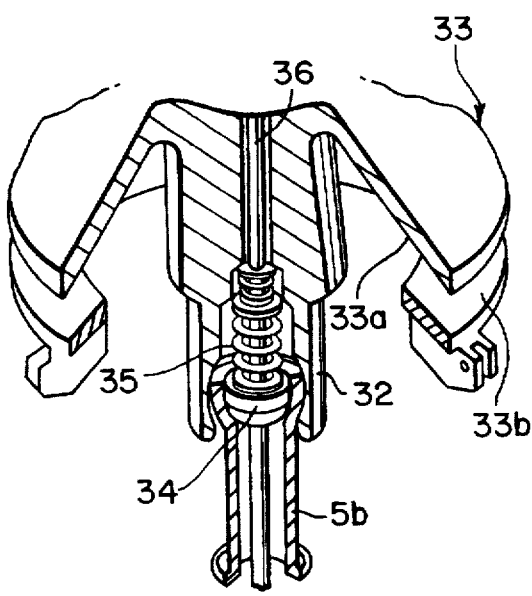

CONTROL ROD DRIVE MECHANISM

BACKGROUND OF THE INVENTION

1. Technical Field

The present invention relates to a hydraulic control rod drive mechanism used in a boiling water reactor (hereinafter abbreviated to BWR) and, in particular, to a control rod drive mechanism designed to reduce piping space and also remove the need for a speed limiter for the control rod, by making it not necessary to have piping for extraction drive and by using a bayonet coupling that provides a highly reliable linkage with the control rod.

2. Prior Art

In general, a BWR accommodates coolant materials and a core within a reactor pressure vessel. The core consists of a plurality of fuel assemblies, control rods, etc. The output of the core is controlled by adjusting the amount by which each control rod is driven by a control rod drive mechanism (hereinafter abbreviated to CRD) to be inserted into the core.

The configuration of a prior-art CRD will now be described with reference to FIG. 4. This figure is a cross-section through the CRD, with reference number 1 denoting part of a base wall of a reactor pressure vessel, and a housing for a control rod drive mechanism (hereinafter abbreviated to CRD housing) 2 is attached to this base wall 1. The main portion of a control rod drive mechanism (hereinafter abbreviated to main CRD assembly) 3 is inserted into and fixed to this CRD housing 2.

A flange 2a is formed at the lower edge of the CRD housing 2 and a flange 3a is similarly formed at the lower edge of the main CRD assembly 3. These two flanges 2a and 3a are connected together by connection bolts, which are not shown in the figure.

To describe the configuration of the main CRD assembly 3 in more detail, first of all a thermal sleeve 20, an outer tube 19, and a cylinder tube 4 are disposed in sequence inward from the inner peripheral side of the CRD housing 2. An index tube 5 is disposed on the inner peripheral side of the cylinder tube 4 and a piston tube 6 is disposed on the inner peripheral side of the index tube 5.

The index tube 5 can move vertically along the piston tube 6, the upper end thereof is connected to a control rod 7 with a coupling spud 5b therebetween, and a drive piston 8 is formed at the lower end thereof.

A buffer shaft 9 is linked to an upper portion of the piston tube 6, with a plurality of buffer orifices 10 being formed in the peripheral wall of this buffer shaft 9. A stop piston 11 is attached to the buffer shaft 9 in such a manner that it covers it from above. A buffer piston 12 that is able to move vertically is disposed between the buffer shaft 9 and the stop piston 11, with a buffer spring 13 therebetween.

A control rod locking mechanism 15 is provided at an upper portion of the cylinder tube 4. This control rod locking mechanism 15 is configured of a collet piston 16, collet fingers 17, and a return spring 15. Tip portions 17a of the collet fingers 17 engage with any one of a plurality of indentations 5a provided in the outer wall of the index tube 5, to maintain the insertion position of the control rod 7.

A drive fluid path 21 for control rod insertion, which supplies pressurized drive fluid (water) from a control rod drive fluid system (not shown in the figure) on a lower surface side of the drive piston 8, is formed communicating with a space below the drive piston 8 in the flanges 2a and 3a, and a cooling water orifice 23 is provided branching from this path 21, for allowing cooling water to flow between the thermal sleeve 20 and the outer tube 19. A drive fluid path 22 for control rod extraction is formed in the flanges 2a and 3a, communicating with a space within the piston tube 6.

First of all, when the control rod 7 is to be inserted into the reactor core with the above described configuration, drive fluid is supplied to the lower surface side of the drive piston 8 through the drive fluid path 21 for control rod insertion, as shown by solid arrows in the figure. This supply of drive fluid raises the index tube 5 via the drive piston 8, and this inserts the control rod 7 into the core.

During this time, fluid accommodated in the top of the drive piston 8 flows through the buffer orifices 10 into the space within the piston tube 6, then flows out through the drive fluid path 22 for control rod extraction. When the control rod 7 has been inserted to a predetermined position, the tip portions 17a of the collet fingers 17 engage with one of the indentations 5a in the index tube 5, to hold the control rod 7 at that insertion position.

When the control rod 7 is to be extracted, drive fluid is initially supplied to the drive fluid path 21 for control rod insertion to raise the index tube 5 by half the pitch of the indentations 5a, thus releasing the engagement of the tip portions 17a of the collet fingers 17 with the indentation 5a. Drive fluid is then supplied through the drive fluid path 22 for control rod extraction, as shown by the broken arrows in the figure. Part of this extraction drive fluid acts on the lower surface of the collet piston 16. This action of drive fluid on the lower surface of the collet piston 16 raises the collet fingers 17 and an upper surface 17b of each thereof comes into contact with a guide projection 19a formed in part of the outer tube 19. The upper surface 17b of each collet finger is formed as an oblique surface and this oblique surface is pushed by the guide projection 19a with the result that the collet finger 17 is opened and held in that state.

Another part of the extraction drive fluid is supplied to the space within the piston tube 6. This drive fluid raises the piston tube 6 and then flows out of the piston tube 6 through the buffer orifices 10. It then acts on the upper surface of the drive piston 8 to lower the drive piston 8 and the index tube 5. This extracts the control rod 7 from the core. It should be noted that the fluid on the lower surface side of the drive piston 8 flows to the exterior through the drive fluid path 21 for control rod insertion.

When the reactor is to be stopped in an emergency (hereinafter called "scram"), high-pressure drive fluid is supplied to the lower surface side of the drive piston 8 through the drive fluid path 21 for control rod insertion. This raises the drive piston 8 and the index tube 5 at high speed, with the result that the control rod 7 is inserted rapidly into the core.

The drive piston 8 is raised and comes into contact with the buffer piston 12 during this scram action, and, as this buffer piston 12 is pushed upward, the plurality of buffer orifices 10 formed in the axial direction of the buffer shaft are sequentially closed from below by the buffer piston 12. This generates a pressure loss with respect to the insertion of the control rod and the resultant pressure loss slows the drive piston 8 down until it finally stops, completing the scram action.

When it is not necessary to operate the CRD while the nuclear reactor is operating normally, the cooling water from the control rod drive fluid system (not shown in the figure) flows from the drive fluid path 21 for control rod insertion through the cooling water orifice 23 and into the reactor.

The above described configuration has a certain technical problem. That is, it is necessary with the prior-art configuration to provide two pipelines, one for insertion and one for extraction, as external pipelines for each CRD. This means 370 lines for a power station of the 1100-megawatt class, for instance, necessitating a large piping space and also causing technical problems concerning the construction of the pipelines themselves, the expense of installation, and the time required for this work.

Since the linkage between the CRD and the control rod in the prior-art configuration utilizes a coupling spud method, the reliability of the linkage is comparatively low. Furthermore, a speed limiter is provided at a lower portion of the control rod, to prevent the control rod from falling at a speed above the rated value, on the assumption that the linkage will become disconnected. This raises a further problem in that the length of the entire control rod increases, increasing the overall length of the pressure vessel of the reactor.

This is discussed in detail below with reference to FIG. 5.

FIG. 5(a) is a partially cutaway view of the lower portion of the control rod 7, in a state in which it has separated from the CRD.

In FIG. 5(a), reference number 30 denotes the main assembly of a control rod which wraps around a neutron-absorbing material inserted into the interior of a fuel assembly. A control assembly 31 is provided below this main control rod assembly 30 to support it.

A coupling socket 32 for connection to the coupling spud 5b of the CRD (see FIG. 4) and a speed limiter 33 for restraining the speed at which the control rod 7 drops into the cooling water of the BWR are formed at a lower portion of the control assembly 31. A depression 32a into which a protrusion on the outer peripheral surface at the top of the coupling spud 5b fits is provided on an inner peripheral surface of the coupling socket 32. The speed limiter 33 as a whole opens in the downward direction and a lower surface thereof is formed as a concave space 33a of a shape that traps the cooling water as it falls, and a lower peripheral edge portion thereof is also shaped to have a plurality of outlet ports 33b that allow the cooling water trapped within the concave space 33a to flow out while generating a resistance.

A locking plug 34 is provided within the coupling socket 32. The locking plug 34 is energized elastically downward by a spring 35 and is configured to be capable of moving vertically within the coupling socket 32 and relative thereto by the action of a shaft 36 and the spring 35.

FIG. 5(b) is a partial cutaway view showing the coupling of the control rod 7 in a state in which it is linked to the CRD (by the coupling spud method).

To implement this linkage, the locking plug 34 is initially pulled upward and the coupling spud 5b of the CRD is inserted into the coupling socket 32. The outer diameter of the coupling spud 5b is made to be slightly larger than the inner diameter of the coupling socket 32, and thus the coupling spud 5b is compressed inward during the initial stages of the insertion. When it has reached a certain insertion position, that is, a position at which the tip portion of the coupling spud 5b has reached the depression 32a, the tip portion of the coupling spud 5b expands elastically to engage with the depression 32a of the coupling socket 32. A lower end portion of the locking plug 34 is then inserted into the end portion of the coupling spud 5b by the action of the spring 35, preventing the return of the expanded coupling spud 5b and thus preventing its fall.

The above describes the linkage by the coupling spud method, but it should be clear from that description that if an excessive pulling force is applied to the linkage implemented by the coupling spud method, deformation of the coupling socket 32 or the tip of the coupling spud 5b could cause the linkage to be released.

Thus it is likely with the prior-art coupling spud method that the linkage could be released when the control rod 7 is extracted, by unforeseen cause such as an obstacle between the control rod 7 and the fuel assembly.

The speed limiter 33 acts to control the speed at which the control rod falls, if it falls towards the base wall of the BWR due to some cause such as the above described release of the linkage. In other words, during this fall, the concave space 33a of the speed limiter 33 traps the cooling water, which is allowed to flow out from the outlet ports 33b. However, if the speed of the fall increases, the resistance of the water flowing from the outlet ports 33b increases proportionally, and eventually the control rod falls at a constant speed.

To ensure the above described action, the speed limiter 33 must have a certain size and length, and this increases the length of the control rod.

The present invention was devised to solve the above technical problems with the prior art and has as it objective the provision of a control rod drive mechanism which removes the need for piping for the extraction drive, which also increases the reliability of the linkage with the control rod in such a manner that there is no need to provide a speed limiter for the control rod on the assumption that this linkage will be released, and which enables a reduction in the building costs of a nuclear power station.

SUMMARY OF THE INVENTION

The control rod drive mechanism of the present invention comprises: a control rod drive mechanism housing fixed to a base wall of a reactor's pressure vessel; an outer tube and a cylinder tube accommodated in an inner peripheral side of this control rod drive mechanism housing; an index tube capable of vertical movement, disposed in an inner peripheral side of this cylinder tube and with an upper end thereof connected to a control rod; a drive piston formed at a lower end of this index tube; a piston tube accommodated in an inner peripheral side of this index tube; a buffer shaft connected above this piston tube; a buffer piston and buffer spring disposed on the outer periphery of this buffer shaft; a stop piston disposed above these buffer piston and buffer spring in order to cover them; rollers disposed above this stop piston; a flange to which the control rod drive mechanism housing is connected to fix the lower end of the piston tube in such a manner that movement in the axial and circumferential directions thereof is prevented; a collet piston, collet finger, and return spring disposed above the outer tube and cylinder tube, between the two tubes; a guide cap disposed at an upper end of the outer tube; a latching groove provided in an outer peripheral portion of the index tube and engaging with the collet finger; a guide groove provided in an inner surface of the index tube and mating with the rollers; a bayonet coupling disposed at an upper end of the index tube; an orifice provided in an upper portion of the index tube; and an insertion port provided in the flange and communicating with the drive piston and a collet piston operating port communicating with the collet piston.

BRIEF DESCRIPTION OF THE DRAWINGS

FIG. 1 is a vertical cross-sectional view through an embodiment of the control rod drive mechanism in accordance with this invention;

FIG. 2 is an enlarged horizontal cross-sectional view taken along the line A—A of FIG. 1;

FIGS. 5(a) and 5(b) give perspective views of a coupling-spud type of coupling.

DESCRIPTION OF THE PREFERRED EMBODIMENT

Figure 3A:
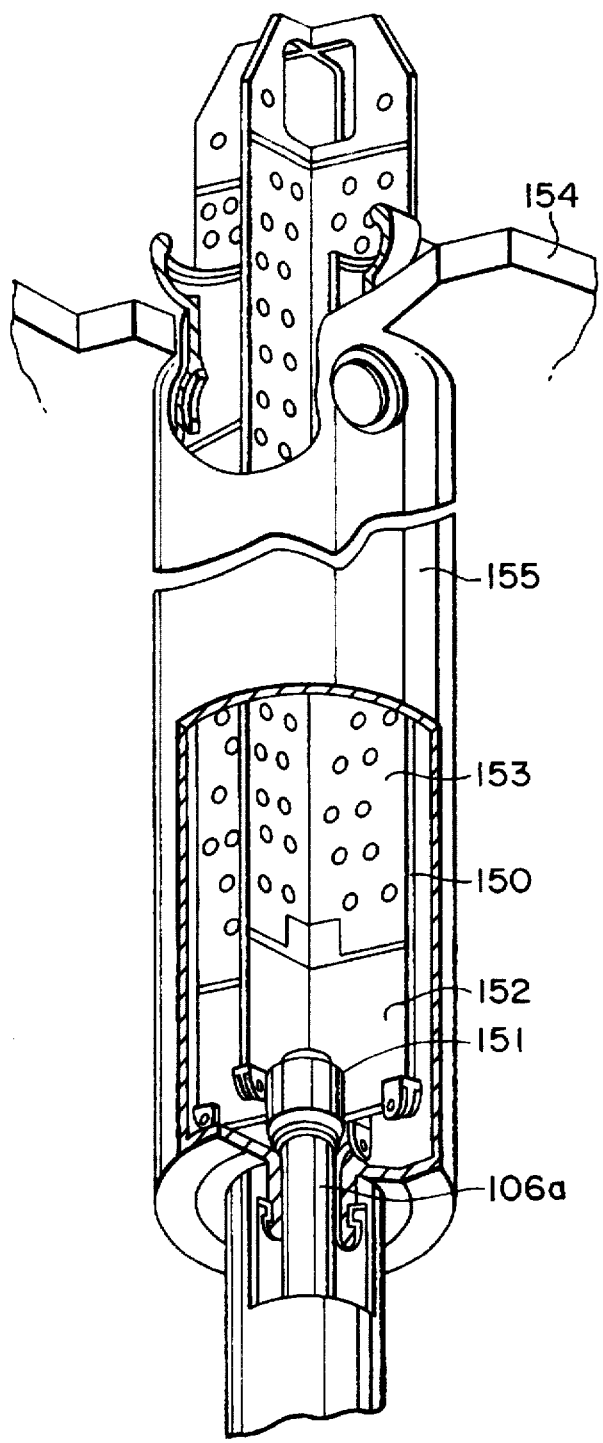
FIGS. 3(a) and 3(b) give perspective views of a bayonet coupling.

An embodiment of the control rod drive mechanism in accordance with this invention will now be described with reference to FIGS. 1 and 2. Note that FIG. 1 shows the control rod drive mechanism of this embodiment of the present invention and FIG. 2 is an enlarged horizontal cross-sectional view taken along the line A—A of FIG. 1.

In the control rod drive mechanism in accordance with this embodiment, reference number 1 in FIG. 1 denotes part of the base wall of the reactor pressure vessel, a CRD housing 2 is fixed to this base wall 1, and a main CRD assembly 103 is inserted into this CRD housing 2 and is fixed thereto by a flange 103a.

To describe the configuration of this main CRD assembly 103 in more detail: first of all, an outer tube 104 and a cylinder tube 105 are disposed on the inner peripheral side of the CRD housing 2. An index tube 106 is disposed on the inner peripheral side of this cylinder tube 105 and a piston tube 107 is further disposed the inner peripheral side of this index tube 106.

The index tube 106 can move vertically, guided by the piston tube 107, a bayonet coupling 106a is provided at an upper end thereof, a linkage is formed by coupling to a control rod (not shown in the figure) and rotating the main CRD assembly 103 through 45 degrees, and a drive piston 108 is provided at a lower end thereof.

The bayonet coupling 106a in this embodiment will now be described with reference to FIG. 3. As shown in FIG. 3, the bayonet coupling 106a is linked to a bayonet coupling socket 151 provided at a lower portion of a control rod 150. The control rod 150 has a control assembly 152 at a lower portion thereof, and the control assembly 152 supports a main control rod assembly 153 that has an X-shaped section. The control rod 150 is guided by a control rod guide tube 155 fixed to a core support plate 154 and it is inserted into the interior of a fuel assembly (not shown in the figure) above the core support plate 154.

Figure 3B:
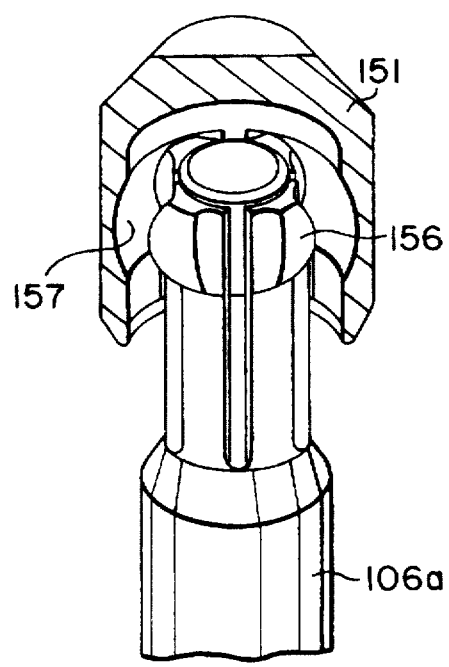
Figure 4:
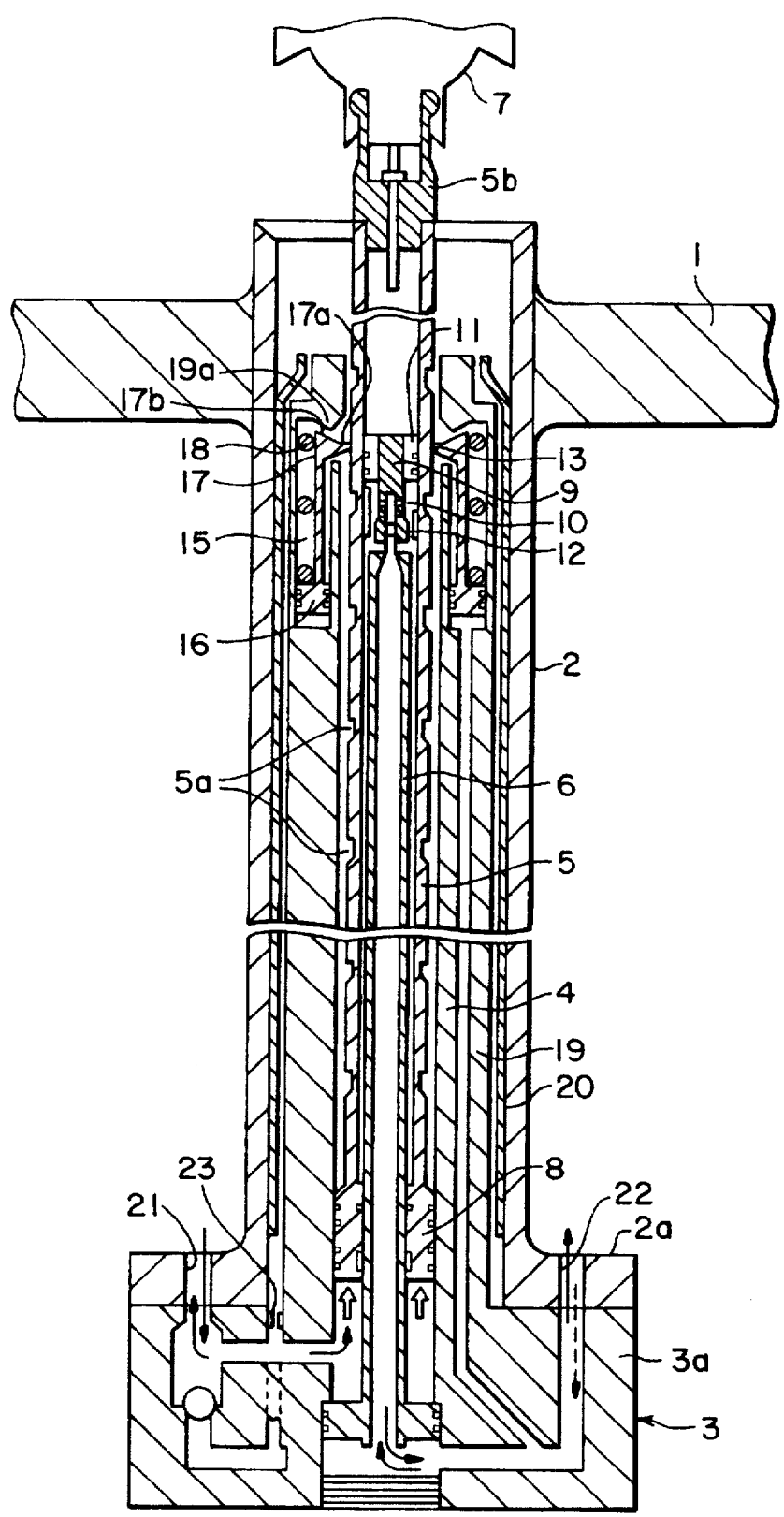
FIG. 4 is a vertical cross-sectional view through a prior-art control rod drive mechanism.

FIG. 3(b) is a partial cutaway view of the bayonet coupling socket 151 when the bayonet coupling is in a linked state. The bayonet coupling 106a has an expansion portion 156 around an external peripheral portion at the top thereof, divided by a groove in the longitudinal direction. The bayonet coupling socket 151 has a groove 157 on an inner peripheral surface thereof that is cut in a key shape to allow the passage of the expansion portion 156. For linkage, the expansion portion 156 of the bayonet coupling 106a is inserted in the longitudinal direction so as to engage with a longitudinal portion of the groove 157 of the bayonet coupling socket 151 and, after the longitudinal insertion, is rotated 45 degrees so that the expansion portion 156 is guided in the lateral direction of the groove 157.

Latching grooves 106b that are a plurality of depressions are provided in the outer peripheral portion of the index tube 106, as shown in FIG. 1, and guide grooves 106c that are a plurality of depressions are provided in the inner surface thereof, as shown in FIG. 2. An orifices 106d is also provided in the upper portion of the index tube 106 to connect the interior and exterior thereof.

A buffer shaft 109 is linked to an upper portion of the piston tube 107, a buffer piston 110 and a buffer spring 111 are disposed on the outer periphery of the buffer shaft 109, and a stop piston 112 is attached so as to cover these components.

Three rollers 113 are connected to the stop piston 112, disposed equidistantly around the periphery of a top portion thereof as shown in FIG. 2, to engage with the guide grooves 106c of the index tube 106. A lower end 121 of the piston tube 107 is fixed to the flange 103a to ensure that the piston tube 107 does not move in the axial and circumferential directions.

A positioning mechanism 114 is provided between upper portions of the outer tube 104 and the cylinder tube 105. This positioning mechanism 114 is configured of a collet piston 115, collet fingers 116, and a return spring 117.

Tip portions 116a of the collet fingers 116 engage with any one of the latching grooves 106b provided in the outer wall of the index tube 106, to maintain the insertion position of the control rod.

An insertion port 118 that communicates with a lower-surface space of the drive piston 108 and supplies drive fluid from a hydraulic system (not shown in the figure) to the lower surface of the drive piston 108 is formed in the flange 103a.

A collet piston operating port 119 is also formed in the flange 103a, passing between the outer tube 104 and the cylinder tube 105 and communicating with the lower surface of the collet piston 115, to supply hydraulic fluid to the lower surface of the collet piston 115.

A guide cap 120 is provided at the upper end of the outer tube 104 with the configuration being such that, when the collet piston 115 is pushed upward, the collet fingers 116 are pushed outward and the tip portions 116a of the collet fingers are thereby removed from the latching groove 106b of the index tube 106.

The operation of the control rod drive mechanism of this embodiment will now be described.

When the control rod (not shown in the figures) is to be inserted into the core with the above described configuration, drive fluid (water) is supplied from the insertion port 118, the pressure on the lower surface of the drive piston 108 and the inner surface of the index tube 106 is pressurized thereby, the index tube 106 is pushed upward, and thus the control rod is inserted into the core.

During this time, the fluid between the index tube 106 and the cylinder tube 105 is exhausted into the core through a gap between the guide cap 120 and the index tube 106. When the control rod has been inserted as far as a predetermined position, the tip portions 116a engage with the latching grooves 106b of the index tube 106, to maintain the insertion position of the control rod.

Next, when the control rod is to be extracted, the hydraulic fluid is supplied from the collet piston operating port 119, the collet piston 115 is pushed upward thereby so that the collet fingers 116 are pushed outward by an oblique portion 122 formed in a lower portion of the guide cap 120, and the tip portions 116a of the collet fingers 116 are removed from the latching grooves 106b of the index tube 106.

Therefore, the index tube 106 falls under the weight of the movable components such as the control rod and the index tube 106. This removes the control rod from the core. Note that the fluid acting on the lower surface of the drive piston 108 and the inner surface of the index tube 106 flows to the exterior through the insertion port 118.

When the reactor is to be stopped in an emergency (hereinafter called "scram"), high-pressure drive fluid is supplied from the insertion port 118, the pressure on the lower surface of the drive piston 108 and the inner surface of the index tube 106 is increased thereby, the index tube 106 is pushed upward at high speed, and, as a result, the control rod is inserted rapidly into the core.

When it is not necessary to operate the CRD while the nuclear reactor is operating normally, low-pressure cooling water from a normal hydraulic system (not shown in the figure) is supplied to the insertion port 118. This low-pressure cooling water passes through a gap between the inner peripheral surface of the drive piston 108 and the outer peripheral surface of the piston tube 107, then passes through the orifice 106d via the inner surface of the index tube 106 and flows into the reactor. This ensures that the CRD is cooled by cooling water during normal operation. In this manner, the functions of the CRD can be satisfied sufficiently, even with the extraction drive line omitted.

Since the piston tube 107 is fixed to the flange 103a, the rollers 113 cannot move in the circumferential direction, and thus the index tube 106 cannot rotate in the circumferential direction because the guide grooves 106c on the inner surface thereof are guided by the rollers 113 that cannot move in the circumferential direction, as described above.

Therefore, after the bayonet coupling 106a fixed to the top end of the index tube 106 is connected to the control rod, rotating the main CRD assembly 103 through 45 degrees to form the linkage ensures that there is no possibility of the linkage portion being released, forming a highly reliable linkage.

Note that guide protrusions could be provided in the longitudinal direction on the inner surface of the index tube 106, instead of the guide grooves 106c and the rollers 113, or a guide groove could be provided in the stop piston 112.

This configuration ensures that there is no possibility of the control rod alone falling, so that, if a fall does occur, the control rod and the index tube 106 will fall as an integral unit. In such a case, the drive piston 108 will act as a damper, limiting the speed of the fall, making it possible to omit the speed limiter of the control rod.

The present invention makes it possible to omit the extraction drive line and satisfy the functions of a CRD by providing a collet piston operating line that can be a narrow pipeline, enabling reductions in the piping space, the expense of installing the piping, and the time required for this work.

Since the speed limiter for the control rod can be omitted, the pressure vessel of the reactor can be made shorter, the height of the reactor building can also be reduced, and thus the cost of building the plant can be reduced and the time required for this work can be shortened.

What is claimed is:

1. A control rod drive mechanism comprising: a control rod drive mechanism housing fixed to a base wall of a reactor's pressure vessel; an outer tube and a cylinder tube accommodated in an inner peripheral side of this control rod drive mechanism housing; an index tube capable of vertical movement, disposed in an inner peripheral side of this cylinder tube and with an upper end thereof connected to a control rod; a drive piston formed at a lower end of this index tube; a piston tube accommodated in an inner peripheral side of this index tube; a buffer shaft connected above this piston tube; a buffer piston and buffer spring disposed on the outer periphery of this buffer shaft; a stop piston disposed above these buffer piston and buffer spring in order to cover them; rollers disposed above this stop piston; a flange to which said control rod drive mechanism housing is connected to fix the lower end of said piston tube in such a manner that movement in the axial and circumferential directions thereof is prevented; a collet piston, collet finger, and return spring disposed above said outer tube and cylinder tube, between said two tubes; a guide cap disposed at an upper end of said outer tube; a latching groove provided in an outer peripheral portion of said index tube and engaging with said collet finger; a guide groove provided in an inner surface of said index tube and mating with the rollers; a bayonet coupling disposed at an upper end of said index tube; an orifice provided in an upper portion of said index tube; and an insertion port provided in said flange and communicating with said drive piston and a collet piston operating port communicating with said collet piston.

2. A control rod drive mechanism as defined in claim 1, wherein a guide protrusion is provided in the axial direction of an inner surface of said index tube, and a guide groove for engaging with said guide protrusion is provided in the stop piston.

3. A control rod drive mechanism as defined in claim 1, wherein a thermal sleeve provided for passing cooling water over an inner surface of said index tube and protecting the control rod drive mechanism by the passage of water is omitted.

4. A control rod drive mechanism as defined in claim 1, wherein said index tube is guided by the inner periphery of said drive piston, the outer periphery of the stop piston, and rollers.

5. A control rod drive mechanism as defined in claim 1, wherein said index tube is guided by the inner periphery of said drive piston and rollers of the stop piston portion.

* * * * *